US012700347B2

(12) United States Patent
Lee

(10) Patent No.: US 12,700,347 B2
(45) Date of Patent: Aug. 4, 2026

(54) PIXEL CIRCUIT AND DISPLAY DEVICE HAVING THE SAME

(71) Applicant: Samsung Display Co., LTD., Yongin-si (KR)

(72) Inventor: Gichang Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/986,914

(22) Filed: Dec. 19, 2024

(65) Prior Publication Data

US 2025/0316215 A1 Oct. 9, 2025

(30) Foreign Application Priority Data

Apr. 9, 2024 (KR) ........................ 10-2024-0047820

(51) Int. Cl.
*G09G 3/32* (2016.01)
*G09G 3/3233* (2016.01)

(52) U.S. Cl.
CPC ............ *G09G 3/32* (2013.01); *G09G 3/3233* (2013.01); *G09G 2230/00* (2013.01); *G09G 2300/0819* (2013.01); *G09G 2300/0852* (2013.01); *G09G 2310/08* (2013.01)

(58) Field of Classification Search
CPC ............ G09G 3/32; G09G 2300/0819; G09G 2300/0852; G09G 2310/08; G09G 3/3233; G09G 3/3266; G09G 2230/00; G09G 2300/0426; G09G 2300/0809
See application file for complete search history.

(56) References Cited

U.S. PATENT DOCUMENTS

| | | | | |
|---|---|---|---|---|
| 2018/0301080 | A1* | 10/2018 | Shigeta | G09G 3/32 |
| 2020/0265777 | A1* | 8/2020 | Shigeta | G09G 3/2014 |
| 2022/0114951 | A1* | 4/2022 | Chang | G09G 3/32 |
| 2023/0078842 | A1* | 3/2023 | Kim | G09G 3/32 257/443 |
| 2024/0144868 | A1* | 5/2024 | Chen | G09G 3/3233 |
| 2025/0111817 | A1* | 4/2025 | Lin | G09G 3/2018 |
| 2025/0148963 | A1* | 5/2025 | Lin | G09G 3/32 |

FOREIGN PATENT DOCUMENTS

| | | |
|---|---|---|
| KR | 1020200101605 A | 8/2020 |
| KR | 102362145 B1 | 2/2022 |
| KR | 1020230078700 A | 6/2023 |

OTHER PUBLICATIONS

Junyang Nie, et al. "Systematic study on size and temporal dependence of micro-LED arrays for display applications", Received Nov. 4, 2022; accepted Jan. 11, 2023; posted Jan. 18, 2023 (Doc. ID 479593); published Mar. 9, 2023 (9 Pages).

* cited by examiner

*Primary Examiner* — Antonio Xavier
(74) *Attorney, Agent, or Firm* — CANTOR COLBURN LLP

(57) ABSTRACT

A pixel circuit includes a voltage applier which generates an alternating control voltage based on a data voltage and a sweep voltage, an alternating signal generator which outputs an alternating signal based on the alternating control voltage, an emission controller which applies a driving current to a light emitting element in response to an emission signal and the alternating signal, and the light emitting element connected to the emission controller.

17 Claims, 9 Drawing Sheets

PIXEL CIRCUIT AND DISPLAY DEVICE HAVING THE SAME

This application claims priority to Korean Patent Application No. 10-2024-0047820, filed on Apr. 9, 2024, and all the benefits accruing therefrom under 35 U.S.C. § 119, the content of which in its entirety is herein incorporated by reference.

BACKGROUND

1. Field

Embodiments of the invention relate to a pixel circuit and a display device including the pixel circuit. More particularly, embodiments of the invention relate to a pixel circuit that improves an emission efficiency of a light emitting element included therein and a display device including the pixel circuit.

2. Description of the Related Art

Generally, a display device includes a display panel and a display panel driver. The display panel may include a plurality of gate lines, a plurality of data lines, a plurality of emission lines and a plurality of pixels. The display panel driver may include a gate driver for providing a gate signal to the gate lines, a data driver for providing a data voltage to the data lines, an emission driver for providing an emission signal to the emission lines and a driving controller for controlling the gate driver, the data driver and the emission driver.

Generally, an efficiency of a light emitting element may be different according to a signal which is applied to the light emitting element.

SUMMARY

Embodiments of the invention provide a pixel circuit that improves an emission efficiency of a light emitting element therein by applying an alternating signal having a short period to the light emitting element.

Embodiments of the invention also provide a display device including the pixel circuit.

According to embodiments, a pixel circuit includes a voltage applier which generates an alternating control voltage based on a data voltage and a sweep voltage, an alternating signal generator which outputs an alternating signal based on the alternating control voltage, an emission controller which applies a driving current to a light emitting element in response to an emission signal and the alternating signal and the light emitting element connected to the emission controller.

In an embodiment, the alternating signal generator may include a first alternating signal control transistor which applies a voltage of an output node of a ring oscillator to an input node of the ring oscillator in response to the alternating control voltage, the ring oscillator which outputs the alternating signal and a second alternating signal control transistor which applies a low voltage to the ring oscillator in response to the alternating control voltage.

In an embodiment, the ring oscillator may include odd number of inverter circuits.

In an embodiment, the inverter circuits may include a first inverter transistor including a control electrode connected to the first alternating signal control transistor and the second alternating signal control transistor, a first electrode which receives a high voltage and a second electrode connected to a first electrode of a second inverter transistor, and the second inverter transistor including a control electrode connected to the first alternating signal control transistor and the second alternating signal control transistor, the first electrode connected to the second electrode of the first inverter transistor and a second electrode which receives the low voltage.

In an embodiment, the first alternating signal control transistor may include a control electrode connected to the voltage applier, a first electrode connected to the output node and a second electrode connected to the input node. In such an embodiment, the second alternating signal control transistor may include a control electrode connected to the voltage applier, a first electrode connected to the input node and a second electrode connected to the low voltage.

In an embodiment, the voltage applier may include a first transistor including a control electrode which receives a write gate signal, a first electrode which receives the data voltage and a second electrode connected to a first node, a second transistor including a control electrode connected to the first node, a first electrode which receives a reference voltage and a second electrode connected to a second node, a third transistor including a control electrode which receives an initialization gate signal, a first electrode connected to the second node and a second electrode connected to the alternating signal generator and a first capacitor including a first electrode which receives the sweep voltage and a second electrode connected to the first node.

In an embodiment, during a sweep voltage applying period, the sweep voltage may be linearly increased In such an embodiment, the second transistor may be an N-type transistor.

In an embodiment, during a sweep voltage applying period, the sweep voltage may be linearly decreased. In such an embodiment, the second transistor may be a P-type transistor.

In an embodiment, the voltage applier may further include a hold capacitor including a first electrode connected to the second node and a second electrode connected to the second electrode of the third transistor.

In an embodiment, a frame period during which the pixel circuit is driven may include a first period and a second period. In such an embodiment, in the first period, the initialization gate signal may have an activation level, the write gate signal may have an inactivation level, such that the third transistor may be turned on and the first transistor may be turned off.

In an embodiment, in the second period following the first period, the initialization gate signal may have an inactivation level, the write gate signal may have an activation level, such that the first transistor may be turned on and the third transistor may be turned off.

In an embodiment, a frame period during which the pixel circuit is driven may include a first period. In such an embodiment, in the first period, the initialization gate signal may have an activation level, the write gate signal may have an activation level, such that the first transistor may be turned on and the third transistor may be turned on.

In an embodiment, the emission controller may include a first emission control transistor including a first electrode which receives the emission signal, a first electrode which receives a first power voltage and a second electrode connected to a fifth node and a driving transistor including a control electrode connected to the alternating signal generator, a first electrode connected to the fifth node and a second electrode connected to the light emitting element.

According to embodiments, a pixel circuit includes a first transistor including a control electrode which receives a write gate signal, a first electrode which receives a data voltage and a second electrode connected to a first node, a second transistor including a control electrode connected to the first node, a first electrode which receives a reference voltage and a second electrode connected to a second node, a third transistor including a control electrode connected to the second node, a first electrode connected to the second node and a second electrode which receives a high voltage, a fourth transistor including a control electrode connected to the second node, a first electrode connected to a third node and a second electrode connected to a fourth node, a fifth transistor including a control electrode connected to the second node, a first electrode connected to the third node and a second electrode connected to a fourth node, a sixth transistor including a control electrode which receives an emission signal, a first electrode which receives a first power voltage and a second electrode connected to a fifth node, a seventh transistor including a control electrode connected to the fourth node, a first electrode connected to the fifth node and a second electrode connected to the light emitting element, a first inverter transistor including a control electrode connected to the third node, a first electrode which receives the high voltage and a second electrode connected to a sixth node, a second inverter transistor including a control electrode connected to the third node, a first electrode connected to the sixth node and a second electrode which receives the low voltage, a second inverter transistor including a control electrode connected to the third node, a first electrode connected to the sixth node and the second electrode which receives the low voltage, a third inverter transistor including a control electrode connected to the sixth node, a first electrode which receives the high voltage and a second electrode connected to a seventh node, a fourth inverter transistor including a control electrode connected to the sixth node, a first electrode connected to the seventh node and a second electrode which receives the low voltage, a fifth inverter transistor including a control electrode connected to the seventh node, a first electrode which receives the high voltage and a second electrode connected to the fourth node, a sixth inverter transistor including a control electrode connected to the seventh node, a first electrode connected to the fourth node and a second electrode which receives the low voltage and the light emitting element.

In an embodiment, a frame period during which the pixel circuit is driven may include first to third periods. In such an embodiment, in the first period, the initialization gate signal may have an activation level, the write gate signal may have an inactivation level, the emission signal may have an inactivation level, such that the third transistor may be turned on, the first transistor may be turned off and the sixth transistor may be turned off. In such an embodiment, in the second period following the first period, the initialization gate signal may have an inactivation level, the write gate signal may have an activation level, the emission signal may have an inactivation level, such that the first transistor may be turned on, the third transistor may be turned off and the sixth transistor may be turned off. In such an embodiment, in the third period following the second period, the initialization gate signal may have an inactivation level, the write gate signal may have an inactivation level, the emission signal may have an activation level, such that the first transistor may be turned off, the third transistor may be turned off and the sixth transistor may be turned on.

According to embodiments, a display device includes a display panel including a pixel circuit, a data driver which applies a data voltage to the display panel, a gate driver which outputs a gate signal to the display panel, a sweep voltage generator which applies a sweep voltage to the display panel and an emission driver which applies an emission signal to the display panel. In such an embodiment, the pixel circuit includes a voltage applier which generates an alternating control voltage based on the data voltage and the sweep voltage, an alternating signal generator which outputs an alternating signal based on the alternating control voltage, an emission controller which applies a driving current to a light emitting element in response to the emission signal and the alternating signal and the light emitting element connected to the emission controller.

In an embodiment, the alternating signal generator may include a first alternating signal control transistor which applies a voltage of an output node of a ring oscillator to an input node of the ring oscillator in response to the alternating control voltage, the ring oscillator which outputs the alternating signal and a second alternating signal control transistor which applies a low voltage to the ring oscillator in response to the alternating control voltage.

In an embodiment, the ring oscillator may include odd number of inverter circuits. The inverter circuit may include a first inverter transistor including a control electrode connected to the first alternating signal control transistor and the second alternating signal control transistor, a first electrode which receives a high voltage and a second electrode connected to a first electrode of a second inverter transistor, and a second inverter transistor including a control electrode connected to the first alternating signal control transistor and the second alternating signal control transistor, the first electrode connected to the second electrode of the first inverter transistor and a second electrode which receives the low voltage.

In an embodiment, the first alternating signal control transistor may include a control electrode connected to the voltage applier, a first electrode connected to the output node and a second electrode connected to the input node. In such an embodiment, The second alternating signal control transistor may include a control electrode connected to the voltage applier, a first electrode connected to the input node and a second electrode connected to the low voltage.

In an embodiment, the alternating signal generator may include a first inverter transistor including a control electrode connected to the input node, a first electrode which receives the high voltage and a second electrode connected to a sixth node, a second inverter transistor including a control electrode connected to the input node, a first electrode connected to the sixth node and a second electrode which receives the low voltage, a third inverter transistor including a control electrode connected to the sixth node, a first electrode which receives the high voltage and a second electrode connected to a seventh node, a fourth inverter transistor including a control electrode connected to the sixth node, a first electrode connected to the seventh node and a second electrode which receives the low voltage, a fifth inverter transistor including a control electrode connected to the seventh node, a first electrode which receives the high voltage and a second electrode connected to the output node and a sixth inverter transistor including a control electrode connected to the seventh node, a first electrode connected to the output node and a second electrode which receives the low voltage.

As described above, according to embodiments of a pixel circuit and a display device including the pixels circuit, an alternating signal may be applied to a light emitting element included in the pixel circuit. Generally, when a pulse voltage is applied to the light emitting element, an efficiency of the light emitting element may be changed. Additionally, the efficiency of the light emitting element may be higher in an initial period of the pulse voltage than in a normal period of the pulse voltage. In embodiments of the invention, the alternating signal may have a pulse period corresponding to the initial period of the pulse period and the alternating signal may have a short period, such that the efficiency of light emitting element may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
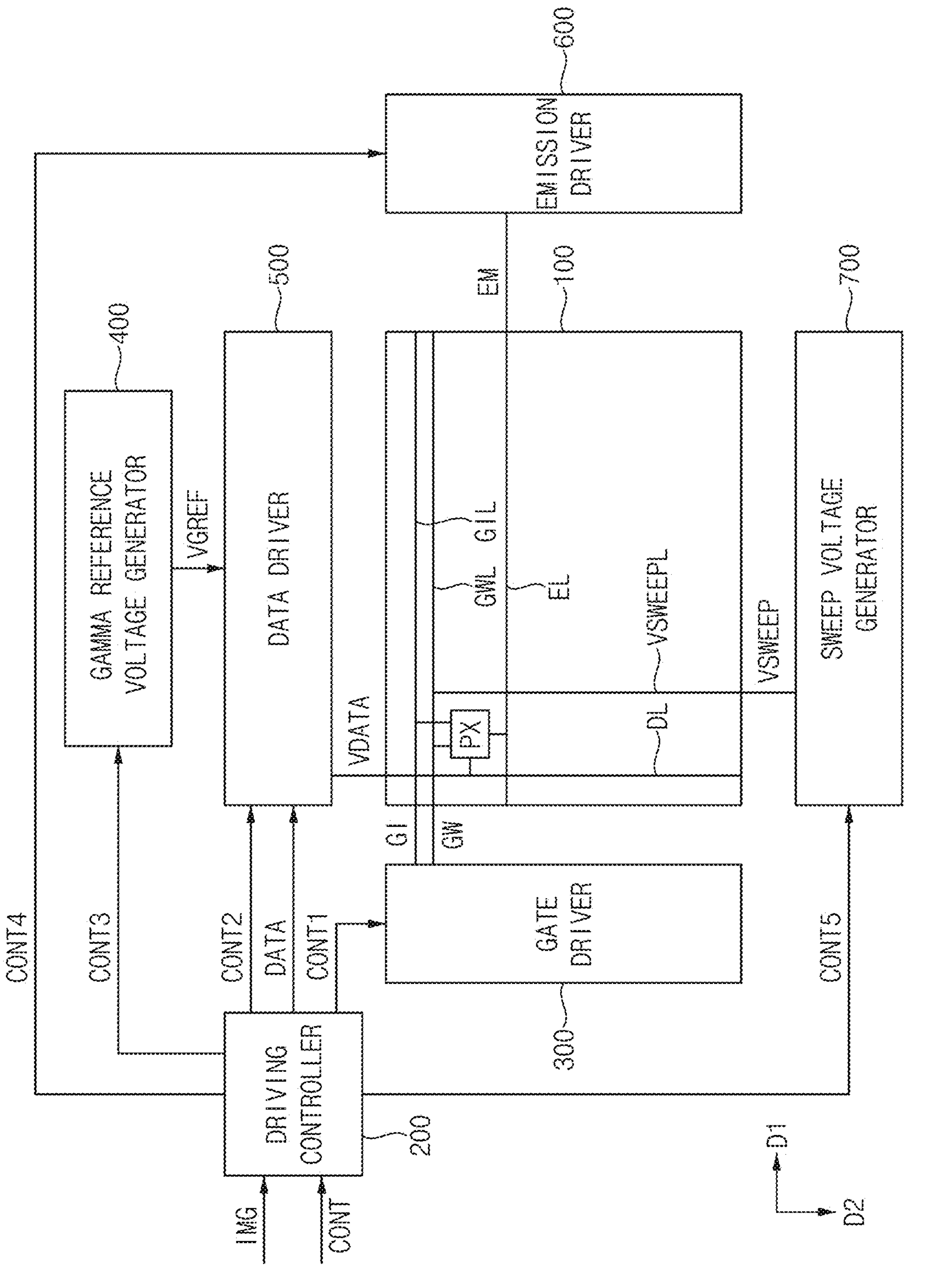
FIG. 1 is a block diagram illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a display device according to embodiments of the invention.

Referring to FIG. 1, an embodiment of the display device includes a display panel 100 and a display panel driver. In an embodiment, the display panel driver includes a driving controller 200, a gate driver 300, a gamma reference voltage generator 400, a data driver 500, an emission driver 600 and a sweep voltage generator.

The display panel 100 has a display region, on which an image is displayed, and a peripheral region adjacent to the display region.

The display panel 100 may include a plurality of gate lines GIL and GWL, a plurality of data lines DL, a plurality of emission lines EL, a plurality of sweep voltage lines VSWEEPL and a plurality of pixel circuits PX electrically connected to the gate lines GIL and GWL, the data lines DL, the emission lines EL, the sweep voltage lines VSWEEPL. The gate lines GIL and GWL may extend in a first direction D1, the data lines DL may extend in a second direction D2 crossing the first direction D1 and the emission lines EL may extend in the first direction D1.

The driving controller 200 receives input image data IMG and an input control signal CONT from an external apparatus. In an embodiment, for example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4, a fifth control signal CONT5 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth second control signal CONT4 to the emission driver 600.

The driving controller 200 generates the fifth control signal CONT5 for controlling an operation of the sweep voltage generator 700 based on the input control signal CONT, and outputs the fifth control signal CONT5 to the sweep voltage generator 700.

The gate driver 300 generates gate signals GI and GW for driving the gate lines GIL and GWL in response to the first control signal CONT1 received from the driving controller 200. The gate driver 300 may output the gate signals GI and GW to the gate lines GIL and GWL.

In an embodiment of the invention, the gate driver 300 may be integrated on the peripheral region of the display panel 100. In an embodiment of the invention, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in (or integrated into) the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

In an embodiment of the invention, the data driver 500 may be integrated on the peripheral region of the display panel 100. In an embodiment of the invention, the data driver 500 may be mounted on the peripheral region of the display panel 100.

In an embodiment, the data driver 500 may be implemented with one or more integrated circuits. In another embodiment, the data driver 500 and the driving controller 200 may be implemented as a single integrated circuit and the single integrated circuit may be called (or referred to) as a timing controller embedded data driver (TED).

The emission driver 600 generates the emission signal EM for driving the emission line EL in response to the fourth control signal CONT4 received from the driving controller 200. The emission driver 600 may output the emission signal EM to the emission line EL.

In an embodiment of the invention, the emission driver 600 may be integrated on the peripheral region of the display panel 100. In an embodiment of the invention, the emission driver 600 may be mounted on the peripheral region of the display panel 100.

The sweep voltage generator 700 generates a sweep voltage VSWEEP for driving the sweep voltage line VSWEEPL in response to the fifth control signal CONT5 received from the driving controller 200. The sweep voltage generator 700 may output the sweep voltage VSWEEP to the sweep voltage line VSWEEPL. In an embodiment, for example, the sweep voltage VSWEEP may be increased linearly. In an embodiment, for example, the sweep voltage VSWEEP may be decreased linearly.

In an embodiment, the sweep voltage generator 700 may be implemented with one or more integrated circuits. In another embodiment, the sweep voltage generator 700 and the gate driver 300 may be implemented as a single integrated circuit.

Although FIG. 1 shows an embodiment where the gate driver 300 is disposed on a first side of the display panel 100, and the emission driver 600 is disposed on a second side of the display panel 100, which is opposite to the first side, the invention is not limited thereto. In another embodiment, the gate driver 300 and the emission driver 600 may be disposed on a same side of the display panel 100. In an embodiment, for example, the gate driver 300 and the emission driver 600 may be integrated on the peripheral region of the display panel 100 on the same side of the display region of the display panel 100. In an embodiment, for example, the gate driver 300 and the emission driver 600 may be formed integrally with each other as a single circuit.

Figure 2:
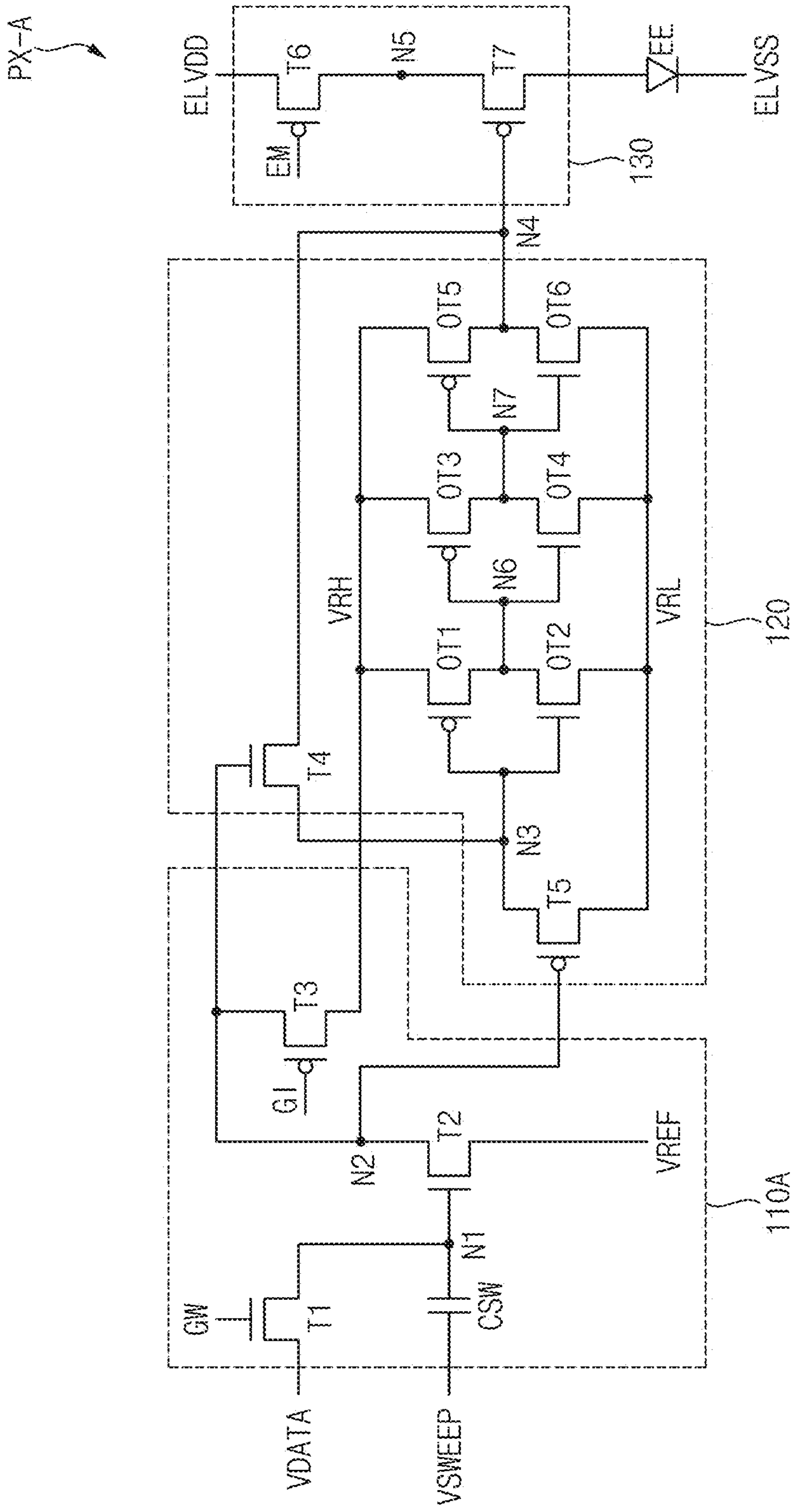
FIG. 2 is a circuit diagram illustrating an example of a pixel included in a display device of FIG. 1.

FIG. 2 is a circuit diagram illustrating an example of a pixel PX included in a display device of FIG. 1.

Referring to FIG. 2, in an embodiment, a pixel circuit PX-A may include a voltage applier 110A, an alternating signal generator 120, an emission controller 130 and a light emitting element EE.

The voltage applier 110A may receive the data voltage VDATA and the sweep voltage VSWEEP. In an embodiment, for example, the voltage applier 110A may receive the data voltage VDATA from the data line DL. In an embodiment, for example, the voltage applier 110A may receive the sweep voltage VSWEEP from the sweep voltage line VSWEEPL.

In an embodiment, the voltage applier 110A may include a first transistor T1, a second transistor T2, a third transistor T3 and a first capacitor CSW. The first transistor T1 may include a control electrode that receives a write gate signal GW, a first electrode that receives the data voltage VDATA and a second electrode connected to a first node N1. The second transistor T2 may include a control electrode connected to the first node N1, a first electrode that receives a reference voltage VREF and a second electrode connected to a second electrode connected to a second node N2. The third transistor T3 may include a control electrode that receives an initialization gate signal GI, a first electrode connected to the second node N2 and a second electrode that receives a high voltage VRH. The first capacitor CSW may include a first electrode that receives the sweep voltage VSWEEP and a second electrode connected to the first node N1. For example, the high voltage VRH may be called as a high power voltage. In an embodiment, for example, the high voltage VRH may be a power voltage that receives from the display panel driver.

The first transistor T1 may apply the data voltage VDATA to the first node N1 in response to the write gate signal GW. The second transistor T2 may apply the reference voltage VREF to the second node N2 in response to a voltage of the first node N1. The third transistor T3 may apply the high voltage VRH to the second node N2 in response to the initialization gate signal GI.

In an embodiment, a voltage of the second node N2 may be called as an alternating control voltage. For example, when the second transistor T2 is turned on, the alternating control voltage may be the reference voltage VREF. For example, the third transistor T3 is turned on, the alternating control voltage may be the high voltage VRH. In an embodiment, the voltage applier 110A may generate the alternating control voltage based on the data voltage VDATA and the sweep voltage VSWEEP.

In an embodiment, when the sweep voltage VSWEEP is increased linearly during a sweep voltage applying period, the second transistor T2 may be an N-type transistor. In an embodiment, the sweep voltage VSWEEP is decreased linearly, the second transistor T2 may be a P-type transistor.

In an embodiment, the sweep voltage VSWEEP may be linearly increased or decreased during the sweep voltage applying period, such that the second transistor T2 may be changed from a turned off state to a turned on state.

In an embodiment, for example, where the sweep voltage VSWEEP is increased linearly, the second transistor T2 may be the N-type transistor. In such an embodiment, the voltage of the first node N1 may be increased linearly. When the voltage of the first node N1 is increased linearly such that the voltage of the first node N1 is higher than a threshold voltage of the second transistor T2, the second transistor T2 may be turned on. Accordingly, the reference voltage VREF may be applied to the second node N2.

In an embodiment, for example, where the sweep voltage VSWEEP is decreased linearly, the second transistor T2 may be the P-type transistor. In such an embodiment, the voltage of the first node N1 may be decreased linearly. When the voltage of the first node N1 is decreased linearly such that the voltage of the first node N1 is lower than a threshold voltage of the second transistor T2, the second transistor T2 may be turned on. Accordingly, the reference voltage VREF may be applied to the second node N2.

The alternating signal generator 120 may output an alternating signal based on the alternating control voltage. The alternating signal generator 120 may include a first alternating signal control transistor that applies a voltage of an output node of a ring oscillator to an input node of the ring oscillator, the ring oscillator that outputs the alternating signal and a second alternating signal control transistor that applies a low voltage VRL to the inverter circuit based on the alternating control voltage. For example, the low voltage VRL may be called as a low power voltage. In an embodiment, for example, the low voltage VRL may be a power voltage that receives from the display panel driver.

In an embodiment, the alternating signal generator 120 may include a fourth transistor T4, a fifth transistor T5 and the ring oscillator. The ring oscillator may include odd number of inverter circuits. The inverter circuit may include a first inverter transistor OT1 and a second inverter transistor OT2.

In an embodiment, the fourth transistor T4 may include a control electrode connected to the second node N2, a first electrode connected to a third node N3 and a second electrode connected to a fourth node N4. For example, the third node N3 may be called as the input node. For example, the fourth node N4 may be called as the output node. The fourth transistor T4 may control an output of the alternating signal in response to a voltage of the second node N2. In an embodiment, for example, the fourth transistor T4 may apply a voltage of the fourth node N4 to the third node N3. When the voltage of the fourth node N4 is the high voltage VRH, the fourth transistor T4 may apply the high voltage VRH to the third node N3. When a voltage of the third node N3 is the high voltage VRH, the voltage of the fourth node N4 may be changed to the low voltage VRL. Accordingly, the alternating signal may be generated from the fourth node N4. In an embodiment, for example, when the reference voltage VREF is applied to the second node N2, the fourth transistor T4 may be turned off. When the fourth transistor T4 is turned off, the alternating signal may not be outputted from the fourth node N4. For example, the fourth transistor T4 may be called as the first alternating signal control transistor.

In an embodiment, the fifth transistor T5 may include a control electrode connected to the second node N2, a first electrode connected to the third node N3 and a second electrode that receives the low voltage VRL. In an embodiment, for example, when the reference voltage VREF is applied to the second node N2, the fifth transistor T5 may be turned on. In an embodiment, for example, when the fifth transistor T5 is turned on, the high voltage VRH may be applied to the fourth node N4. In an embodiment, the fifth transistor T5 may be a P-type transistor. In an embodiment, the fifth transistor T5 may be an N-type transistor. In an embodiment, for example, when the fifth transistor is the N-type transistor, a channel length and a channel width of the fifth transistor T5 may be different from a channel length and a channel width of the fourth transistor T4. For example, the fifth transistor T5 may be called as the second alternating signal control transistor.

In an embodiment, the first inverter transistor OT1 may include a control electrode connected to the third node N3, a first electrode that receives the high voltage VRH and a second electrode connected to a sixth node N6. In an embodiment, for example, the first inverter transistor OT1 may be a P-type transistor. The second inverter transistor OT2 may include a control electrode connected to the third node N3, a first electrode connected to the sixth node N6 and a second electrode that receives the low voltage VRL. In an embodiment, for example, the second inverter transistor OT2 may be an N-type transistor.

In an embodiment, for example, the alternating signal generator 120 may include three inverter circuits. In an embodiment, for example, the alternating signal generator 120 may include the first inverter transistor OT1, the second inverter transistor OT2, a third inverter transistor OT3, a fourth inverter transistor OT4, a fifth inverter transistor OT5 and a sixth inverter transistor OT6. However, the invention is not limited to a number of the inverter circuits included in the alternating signal generator 120. In an embodiment, for example, the alternating signal generator 120 may include five inverter circuits.

In such an embodiment, as described above, the first inverter transistor OT1 may include a control electrode connected to the third node N3, a first electrode that receives the high voltage VRH and a second electrode connected to the sixth node N6. The second inverter transistor OT2 may include a control electrode connected to the third node N3, a first electrode connected to the sixth node N6 and a second electrode that receives the low voltage VRL. In such an embodiment, the third inverter transistor OT3 may include a control electrode connected to the sixth node N6, a first electrode that receives the high voltage VRH and a second electrode connected to a seventh node N7. The fourth inverter transistor OT4 may include a control electrode connected to the sixth node N6, a first electrode connected to the seventh node N7 and a second electrode that receives the low voltage VRL. The fifth inverter transistor OT5 may include a control electrode connected to the seventh node N7, a first electrode that receives the high voltage VRH and a second electrode connected to the fourth node N4. The sixth inverter transistor OT6 may include a control electrode connected to the seventh node N7, a first electrode connected to the fourth node N4 and a second electrode that receives the low voltage VRL. In an embodiment, for example, the first inverter transistor OT1, the third inverter transistor OT3 and the fifth inverter transistor OT5 may be a P-type transistor. In an embodiment, for example, the second inverter transistor OT2, a fourth inverter transistor OT4 and a sixth inverter transistor OT6 may be an N-type transistor.

In an embodiment, the ring oscillator may apply an inverted voltage of a voltage of the third node N3 to the fourth node N4. While the fourth transistor T4 is maintained in a turned on state, a voltage of the fourth node N4 may swing between the high voltage VRH and the low voltage VRL. Accordingly, the alternating signal may be applied to the emission controller 130.

In an embodiment, the emission controller 130 may apply a driving current to the light emitting element EE in response to the emission signal EM and the alternating signal. The emission controller 130 may include a sixth transistor T6 and a seventh transistor T7.

The sixth transistor T6 may include a control electrode that receives the emission signal EM, a first electrode that receives a first power voltage ELVDD and a second electrode connected to the fifth node N5. The sixth transistor T6 may apply the first power voltage ELVDD to the fifth node N5 in response to the emission signal EM. For example, the sixth transistor T6 may be called as a first emission control transistor.

The seventh transistor T7 may include a control electrode connected to the fourth node N4, a first electrode connected to the fifth node N5 and a second electrode connected to the light emitting element EE. The seventh transistor T7 may apply the driving current for driving the light emitting element EE to the light emitting element EE in response to a voltage of the fourth node N4.

The light emitting element EE may include a first electrode (e.g., anode) connected to the second electrode of the seventh transistor T7 and a second electrode (e.g., cathode) that receives a second power voltage ELVSS.

In an embodiment, the pixel circuit PX-A may be driven as a pulse width modulation. In an embodiment, for example, an emitting time of the light emitting element EE may be controlled based on the data voltage VDATA. Accordingly, a grayscale of the display panel 100 may be controlled based on the data voltage VDATA. Such a control method of the grayscale of the display panel 100 may be called as a pulse width modulation method.

Generally, when the pulse voltage is applied to a light emitting element, the efficiency of the light emitting element may be changed. Additionally, the efficiency of the light emitting element may be higher in the initial period of the pulse voltage than in the normal period of the pulse voltage. For example, when a period of the pulse waveform applied to the light emitting element is shorter, the efficiency of the light emitting element may be higher.

In an embodiment of the invention, as described above, the alternating signal may be applied to the seventh transistor T7 included in the pixel circuit PX-A. The alternating signal may have a pulse period corresponding to the initial period of the pulse voltage. In an embodiment, for example, a period of a pulse waveform of the alternating signal may be short. Accordingly, an emission efficiency of the light emitting element EE may be improved.

Figure 3:
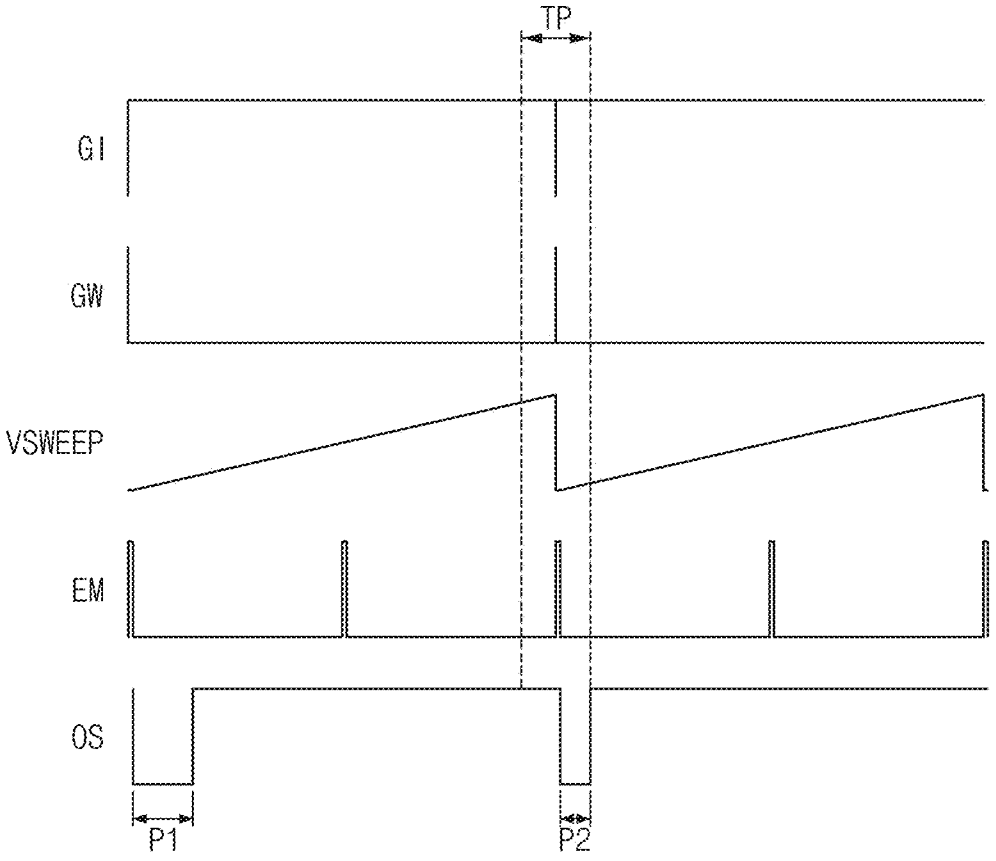
FIG. 3 is graph illustrating signals of pixel circuit of FIG. 2.
Figure 4:
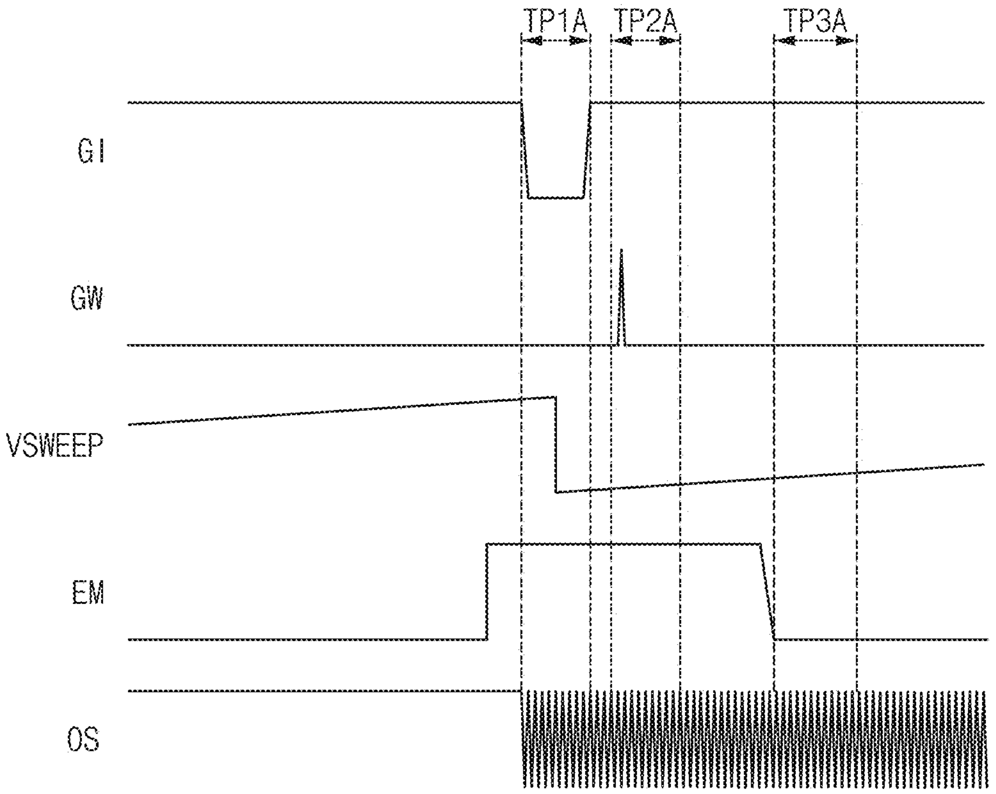
FIG. 4 is a graph illustrating an example of an applying period of FIG. 3.

FIG. 3 is graph illustrating signals of pixel circuit PX-A of FIG. 2. FIG. 4 is a graph illustrating an example of an applying period TP of FIG. 3.

Referring to FIG. 2 and FIG. 3, the pixel circuit PX-A may receive the initialization gate signal GI, the write gate signal GW, the sweep voltage VSWEEP and the emission signal EM. The sweep voltage VSWEEP may be increased linearly between a first voltage and a second voltage. The second voltage may be higher than the first voltage. When the sweep voltage VSWEEP is the second voltage, the sweep voltage VSWEEP may be changed to the first voltage. In an embodiment, for example, a waveform of the sweep voltage VSWEEP may be a waveform that repeats linearly increasing between the first voltage and the second voltage.

In an embodiment, when the data voltage VDATA is a first data voltage, the first data voltage may be applied to the first node N1. In such an embodiment, the sweep voltage VSWEEP may be increased linearly, such that a voltage of the first node N1 may be linearly increased from the first data voltage.

When the voltage of the first node N1 may be lower than a threshold voltage of the second transistor T2, the alternating signal OS may be outputted during a first alternating time P1. The light emitting element EE may emit light in response to the alternating signal OS.

When the voltage of the first node N1 may be higher than the threshold voltage of the second transistor T2, the second transistor T2 may be turned on. When the second transistor T2 is turned on, the reference voltage VREF may be applied to the second node N2. When a voltage of the second node N2 may be the reference voltage VREF, the fourth transistor T4 may be turned off and the fifth transistor T5 may be turned on. Accordingly, a voltage of the fourth node N4 may be the high voltage VRH. When the voltage of the fourth node N4 is the high voltage VRH, the seventh transistor T7 may be turned off. When the seventh transistor T7 is turned off, the light emitting element EE may not emit light. The emission time of the light emitting element EE corresponding to the first data voltage may be called as a first time.

In an embodiment, when the data voltage VDATA is a second data voltage lower than the first data voltage, the second data voltage may be applied to the first node N1. In such an embodiment, the sweep voltage VSWEEP may be increased linearly, such that the voltage of the first node N1 may be increased linearly from the second data voltage.

When the voltage of the first node N1 is lower than the threshold voltage of the second transistor T2, the alternating signal OS may be outputted during a second alternating time P2. The second alternating time P2 may be shorter than the first alternating time P1.

When the voltage of the first node N1 may be higher than the threshold voltage of the second transistor T2, the second transistor T2 may be turned on. When the second transistor T2 is turned on, the reference voltage VREF may be applied to the second node N2. When the voltage of the second node N2 is the reference voltage VREF, the fourth transistor T4 may be turned off and the fifth transistor T5 may be turned on. Accordingly, the voltage of fourth node N4 may be the high voltage VRH. When the voltage of the fourth node N4 is the high voltage VRH, the seventh transistor T7 may be turned off. When the seventh transistor T7 is turned off, the light emitting element EE may not emit light. The emission time of the light emitting element EE corresponding to the second data voltage may be called as a second time. The first time and the second time may be different from each other. Accordingly, a grayscale of the display panel 100 may be controlled based on the second data voltage. Such a control method of the grayscale of the display panel 100 may be called as a pulse width modulation method.

In an embodiment, a period that the initialization gate signal GI, the write gate signal GW and the sweep voltage VSWEEP is changed may be called as an applying period TP.

Referring to FIG. 2 to FIG. 4, the applying period TP may include a first period TP1A, a second period TP2A and a third period TP3A.

In the first period TP1A, the initialization gate signal GI may have an activation level, the write gate signal GW may have an inactivation level, the sweep voltage VSWEEP may be changed from the second voltage to the first voltage and the emission signal EM may have an inactivation level. In the first period TP1A, the initialization gate signal GI may have an activation level, such that the high voltage VRH may applied to the second node N2. In response to the high voltage VRH, the fourth transistor T4 may be turned on and the fifth transistor T5 may be turned off. In the first period TP1A, the fourth transistor T4 may be turned on, such that the alternating signal OS may be generated.

In the second period TP2A following to the first period PT1A, the initialization gate signal GI may have an inactivation level, the write gate signal GW may have an activation level, and the emission signal EM may have an inactivation level. In the second period TP2A, the write gate signal GW may have an activation level, the data voltage VDATA may be applied to the first node N1.

In the third period TP3A following to the second period TP2A, the initialization gate signal GI may have an inactivation level, the write gate signal GW may have an inactivation level and the emission signal EM may have an activation level. The emission signal EM may have an activation level, such that the sixth transistor T6 may be turned on. The driving current may have a period corresponding to the alternating signal OS. A pulse waveform period of the alternating signal OS may be short, and the pulse waveform period of the driving current may be short. Accordingly, an emission efficiency of the light emitting element EE may be improved.

Figure 5:
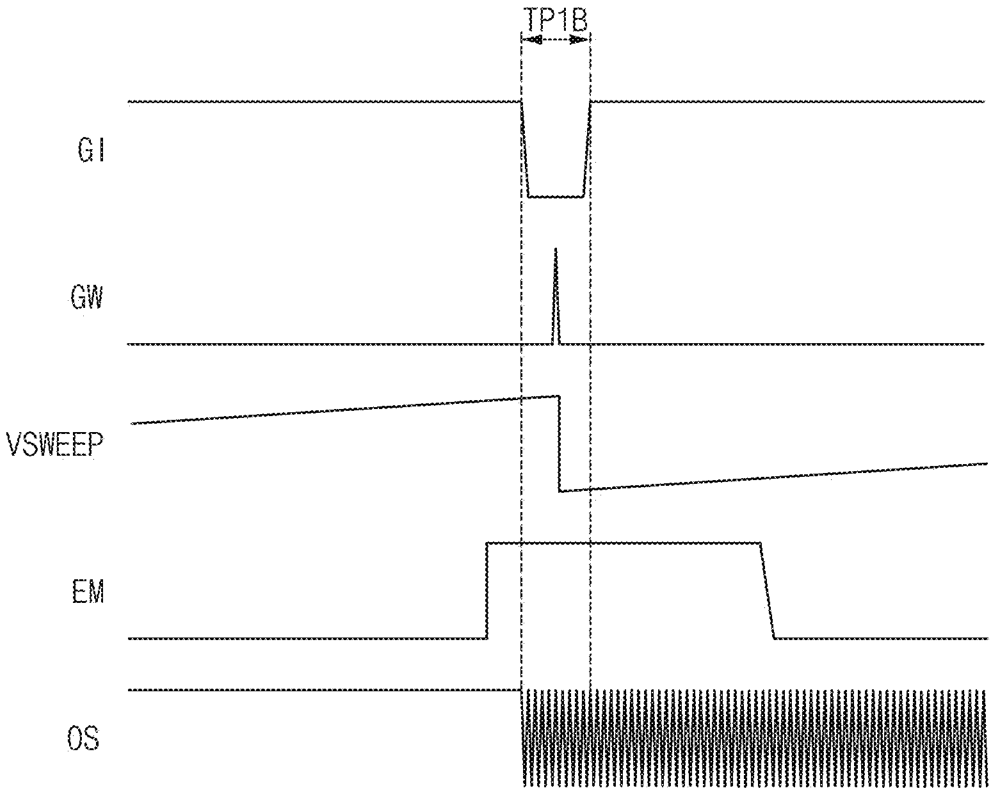
FIG. 5 is a graph illustrating an example of an applying period of FIG. 3.

FIG. 5 is a graph illustrating an example of an applying period TP of FIG. 3.

Referring to FIG. 3 and FIG. 5, the applying period may include a first period TP1B.

In the first period TP1B, the initialization gate signal GI may have an activation level, the write gate signal GW may have an activation level, the sweep voltage VSWEEP may be changed from the second voltage to the first voltage and the emission signal EM may have an inactivation level. In the first period TP1B, the initialization gate signal GI may have an activation level, such that the high voltage VRH may be applied to the second node N2. In response to the high voltage VRH, the fourth transistor T4 may be turned on and the fifth transistor T5 may be turned off. In the first period TP1B, the fourth transistor T4 may be turned on, such that the alternating signal OS may be generated. Additionally, the write gate signal GW may have an activation level, so that the data voltage VDATA may be applied to the first node N1.

Figure 6:
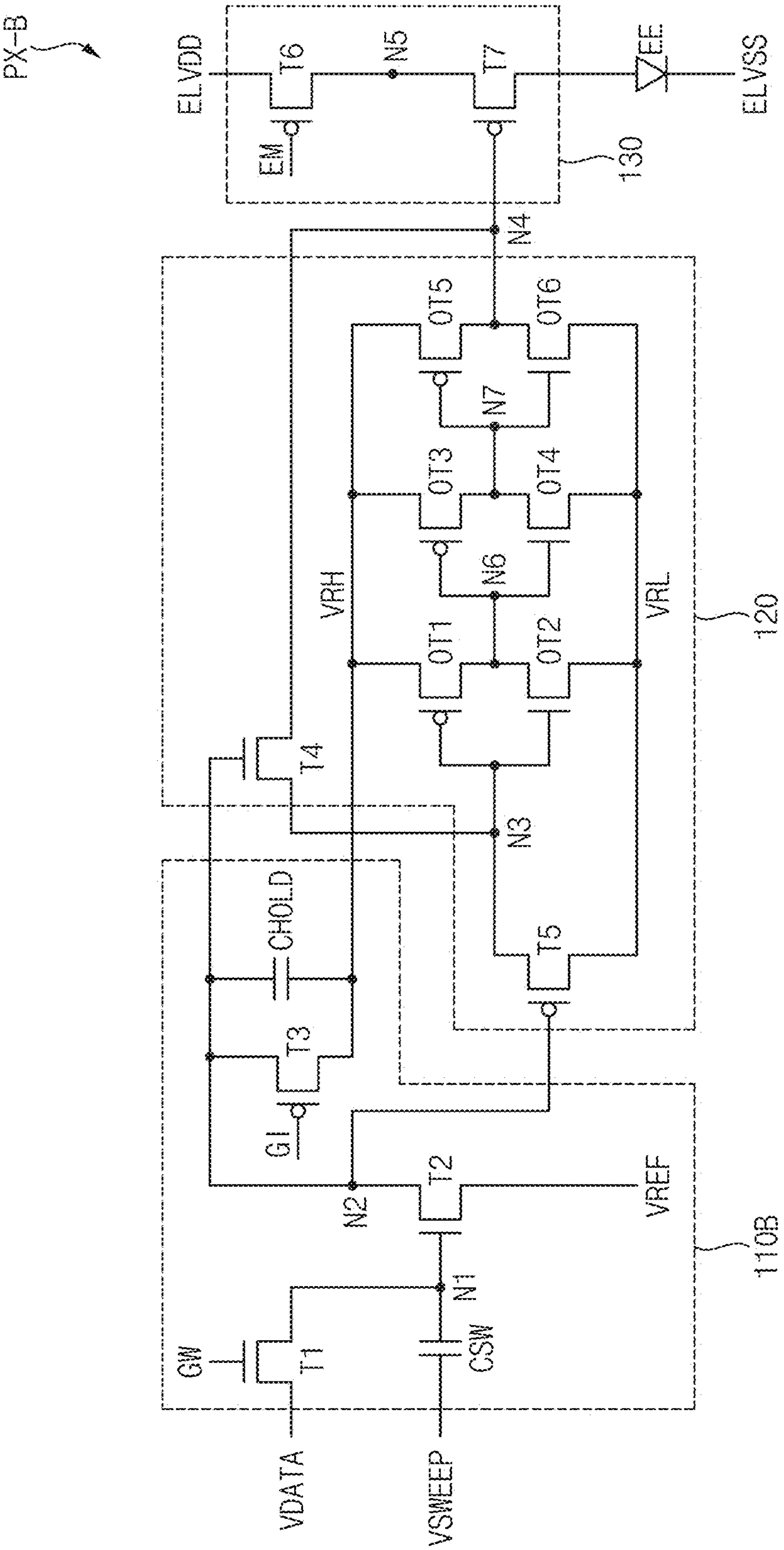
FIG. 6 is a circuit diagram illustrating an example of a pixel circuit included in a display device.

FIG. 6 is a circuit diagram illustrating an example of a pixel circuit PX included in a display device.

A pixel circuit PX-B of FIG. 6 is PXB is substantially the same as the pixel circuit PX-A of FIG. 2 except that the pixel circuit PX-B further includes a hold capacitor CHOLD. The same or like elements shown in FIG. 6 are labeled with the same reference characters as used above to describe the embodiment of the pixel circuit PX-A of FIG. 2, and any repetitive detailed description thereof will hereinafter be omitted or simplified.

In an embodiment, as shown in FIG. 6, the pixel circuit PX-B may include a voltage applier 110B. The voltage applier 110B may include the hold capacitor CHOLD. The hold capacitor CHOLD may include a first electrode connected to the second node N2 and a second electrode that receives the high voltage VRH. The pixel circuit PX-B may further include the hold capacitor CHOLD, so that a reliability and a stability of the pixel circuit PX-B may be improved.

Figure 7:
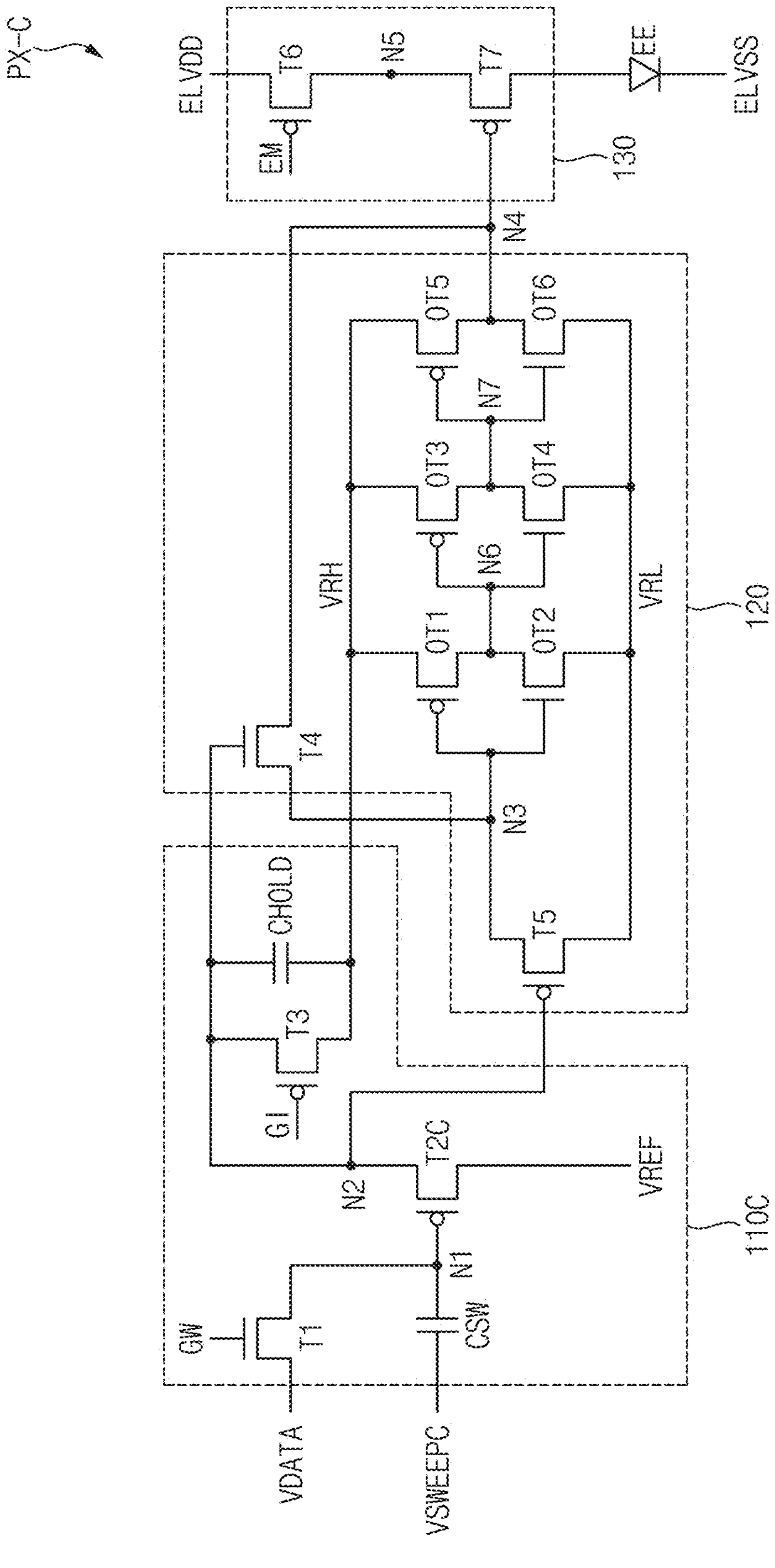
FIG. 7 is a circuit diagram illustrating an example of a pixel circuit included in a display device of FIG. 1.
Figure 8:
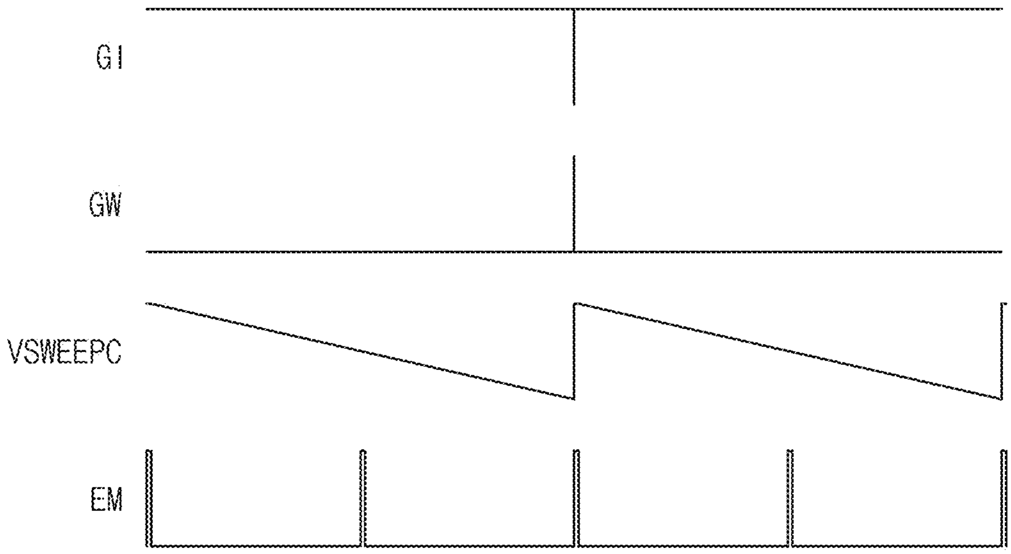
FIG. 8 is a graph illustrating signals applied to a pixel circuit of FIG. 7.

FIG. 7 is a circuit diagram illustrating an example of a pixel circuit PX included in a display device of FIG. 1. FIG. 8 is a graph illustrating signals applied to a pixel circuit PX-C of FIG. 7.

Referring to FIG. 7, a pixel circuit PX-C of FIG. 7 is PXB is substantially the same as the pixel circuit PX-A of FIG. 2 except that a second transistor T2C is a P-type transistor, a second sweep voltage VSWEEPC different from the sweep voltage VSWEEP is applied and the pixel circuit PX-C further includes a hold capacitor CHOLD. The same or like elements shown in FIG. 7 are labeled with the same reference characters as used above to describe the embodiment of the pixel circuit PX-A of FIG. 2, and any repetitive detailed description thereof will hereinafter be omitted or simplified.

Referring to FIG. 8, a graph of FIG. 8 is substantially the same as the graph of FIG. 3 except that a waveform of the second sweep voltage VSWEEPC is decreased linearly from the second voltage to the first voltage. The same or like elements shown in FIG. 8 are labeled with the same reference characters as used above to describe the graph of FIG. 3, and any repetitive detailed description thereof will hereinafter be omitted or simplified.

Referring to FIG. 7 and FIG. 8, an embodiment of the pixel circuit PX-C may include a voltage applier 110C. The voltage applier 110C may include the second transistor T2C. The second transistor T2C may be a P-type transistor. A waveform of the second sweep voltage VSWEEPC may be a waveform that repeats linearly decreasing between the second voltage and the first voltage.

In an embodiment, the voltage applier 110C may include the hold capacitor CHOLD. The hold capacitor CHOLD may include a first electrode connected to the second node N2 and a second electrode that receives the high voltage VRH. The pixel circuit PX-C may further include the hold capacitor CHOLD, such that a reliability and a stability of the pixel circuit PX-C may be improved.

In an embodiment of the invention, the alternating signal may be applied to the seventh transistor T7 included in the pixel circuit PX-C. The alternating signal may have a pulse period corresponding to the initial period of the pulse voltage. Accordingly, an emission efficiency of the light emitting element EE may be improved.

Figure 9:
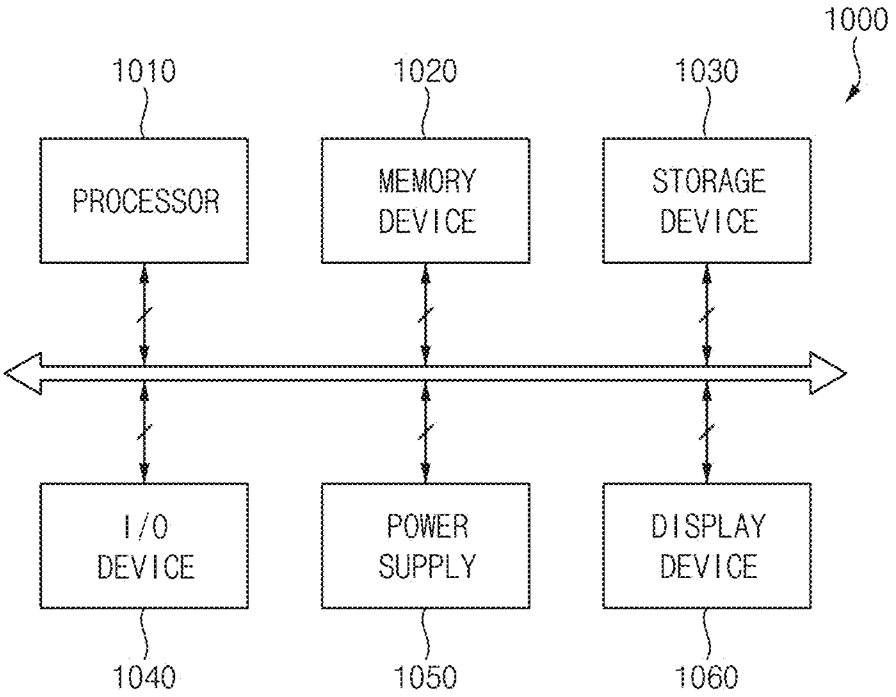
FIG. 9 is a block diagram illustrating an electronic device according to an embodiment of the invention.
Figure 10:
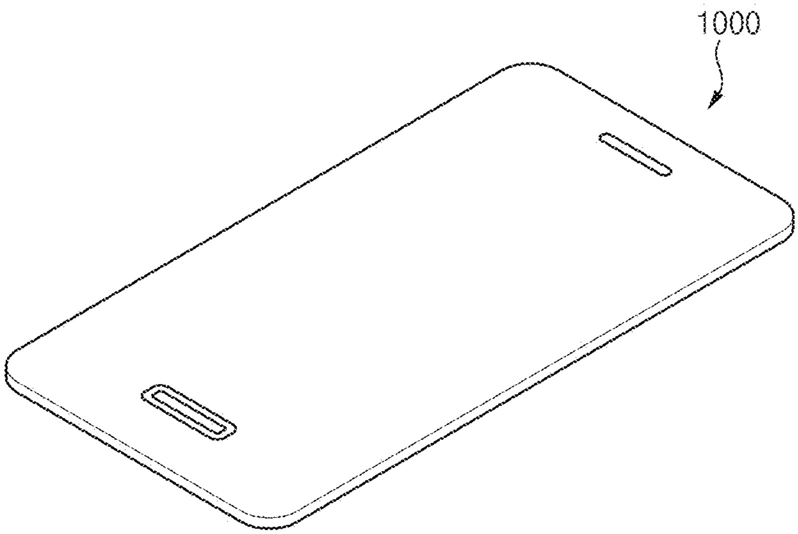
FIG. 10 is a diagram illustrating an example in which the electronic device of FIG. 9 is implemented as a smart phone.

FIG. 9 is a block diagram illustrating an electronic device 1000 according to an embodiment of the invention. FIG. 10 is a diagram illustrating an example in which the electronic device of FIG. 9 is implemented as a smart phone.

Referring to FIG. 9, an embodiment of the electronic device 1000 may include a processor 1010, a memory device 1020, a storage device 1030, an input/output (I/O) device 1040, a power supply 1050, and a display device 1060. Here, the display device 1060 may be the display device of FIG. 1. Additionally, the electronic device 1000 may further include a plurality of ports for communicating with a video card, a sound card, a memory card, a universal serial bus (USB) device, another electronic device, etc.

In an embodiment, as illustrated in FIG. 10, the electronic device 1000 may be implemented as a smart phone. However, the electronic device 1000 is not limited thereto. In another embodiment, for example, the electronic device 1000 may be implemented as a cellular phone, a video phone, a smart pad, a smart watch, a tablet computer, a car navigation system, a computer monitor, a laptop, a head mounted display (HMD) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, and the like and an output device such as a printer, a speaker, or the like. In some embodiments, the display device 1060 may be included in the I/O device 1040. The power supply 1050 may provide power for operations of the electronic device 1000. The display device 1060 may be coupled to other components via the buses or other communication links.

FIG. 10 shows an embodiment where the electronic device is implemented as a smartphone, but the invention is not limited thereto. The electronic device may be a television, a monitor, a laptop computer, or a tablet. Additionally, the electronic device may be a car.

The display device according to the embodiments may be applied to a display device included in a computer, a notebook, a mobile phone, a smart phone, a smart pad, a portable media player (PMP), a personal digital assistant (PDA), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel circuit comprising:

a voltage applier which generates an alternating control voltage based on a data voltage and a sweep voltage;

an alternating signal generator which outputs an alternating signal based on the alternating control voltage;

an emission controller which applies a driving current to a light emitting element in response to an emission signal and the alternating signal; and the light emitting element connected to the emission controller, wherein the alternating signal generator includes:

a first alternating signal control transistor which applies a voltage of an output node of a ring oscillator to an input node of the ring oscillator in response to the alternating control voltage;

the ring oscillator which outputs the alternating signal; and a second alternating signal control transistor which applies a low voltage to the ring oscillator in response to the alternating control voltage.

2. The pixel circuit of claim 1, wherein the ring oscillator includes odd number of inverter circuits.

3. The pixel circuit of claim 2, wherein the inverter circuits include:

a first inverter transistor including a control electrode connected to the first alternating signal control transistor and the second alternating signal control transistor, a first electrode which receives a high voltage and a second electrode connected to a first electrode of a second inverter transistor; and the second inverter transistor including a control electrode connected to the first alternating signal control transistor and the second alternating signal control transistor, the first electrode connected to the second electrode of the first inverter transistor and a second electrode which receives the low voltage.

4. The pixel circuit of claim 1, wherein the first alternating signal control transistor includes a control electrode connected to the voltage applier, a first electrode connected to the output node and a second electrode connected to the input node, and wherein the second alternating signal control transistor includes a control electrode connected to the voltage applier, a first electrode connected to the input node and a second electrode connected to the low voltage.

5. The pixel circuit of claim 1, wherein the voltage applier includes:

a first transistor including a control electrode which receives a write gate signal, a first electrode which receives the data voltage, and a second electrode connected to a first node;

a second transistor including a control electrode connected to the first node, a first electrode which receives a reference voltage and a second electrode connected to a second node;

a third transistor including a control electrode which receives an initialization gate signal, a first electrode connected to the second node and a second electrode connected to the alternating signal generator; and a first capacitor including a first electrode which receives the sweep voltage and a second electrode connected to the first node.

6. The pixel circuit of claim 5, wherein during a sweep voltage applying period, the sweep voltage is linearly increased, and wherein the second transistor is an N-type transistor.

7. The pixel circuit of claim 5, wherein during a sweep voltage applying period, the sweep voltage is linearly decreased, and wherein the second transistor is a P-type transistor.

8. The pixel circuit of claim 5, wherein the voltage applier further includes a hold capacitor including a first electrode connected to the second node and a second electrode connected to the second electrode of the third transistor.

9. The pixel circuit of claim 5, wherein a frame period during which the pixel circuit is driven includes a first period and a second period, and wherein in the first period, the initialization gate signal has an activation level, the write gate signal has an inactivation level, such that the third transistor is turned on and the first transistor is turned off.

10. The pixel circuit of claim 9, wherein in the second period following the first period, the initialization gate signal has an inactivation level, the write gate signal has an activation level, such that the first transistor is turned on and the third transistor is turned off.

11. The pixel circuit of claim 5, wherein a frame period during which the pixel circuit is driven includes a first period, and wherein in the first period, the initialization gate signal has an activation level, the write gate signal has an activation level, such that the first transistor is turned on and the third transistor is turned on.

12. The pixel circuit of claim 1, wherein the emission controller includes:

a first emission control transistor including a first electrode which receives the emission signal, a first electrode which receives a first power voltage and a second electrode connected to a fifth node; and a driving transistor including a control electrode connected to the alternating signal generator, a first electrode connected to the fifth node and a second electrode connected to the light emitting element.

13. A display device comprising:

a display panel including a pixel circuit;

a data driver which applies a data voltage to the display panel;

a gate driver which outputs a gate signal to the display panel;

a sweep voltage generator which applies a sweep voltage to the display panel; and an emission driver which applies an emission signal to the display panel, wherein the pixel circuit includes:

a voltage applier which generates an alternating control voltage based on the data voltage and the sweep voltage;

an alternating signal generator which outputs an alternating signal based on the alternating control voltage;

an emission controller which applies a driving current to a light emitting element in response to the emission signal and the alternating signal; and the light emitting element connected to the emission controller, and wherein the alternating signal generator includes:

a first alternating signal control transistor which applies a voltage of an output node of a ring oscillator to an input node of the ring oscillator in response to the alternating control voltage;

the ring oscillator which outputs the alternating signal; and a second alternating signal control transistor which applies a low voltage to the ring oscillator in response to the alternating control voltage.

14. The display device of claim 13, wherein the ring oscillator includes odd number of inverter circuits, and wherein the inverter circuits include a first inverter transistor including a control electrode connected to the first alternating signal control transistor and the second alternating signal control transistor, a first electrode which receives a high voltage and a second electrode connected to a first electrode of a second inverter transistor, and a second inverter transistor including a control electrode connected to the first alternating signal control transistor and the second alternating signal control transistor, the first electrode connected to the second electrode of the first inverter transistor and a second electrode which receives the low voltage.

15. The display device of claim 13, wherein the first alternating signal control transistor includes a control electrode connected to the voltage applier, a first electrode connected to the output node and a second electrode connected to the input node, and wherein the second alternating signal control transistor includes a control electrode connected to the voltage applier, a first electrode connected to the input node and a second electrode connected to the low voltage.

16. The display device of claim 13, wherein the alternating signal generator includes:

a first inverter transistor including a control electrode connected to the input node, a first electrode which receives the high voltage and a second electrode connected to a sixth node;

a second inverter transistor including a control electrode connected to the input node, a first electrode connected to the sixth node and a second electrode which receives the low voltage;

a third inverter transistor including a control electrode connected to the sixth node, a first electrode which receives the high voltage and a second electrode connected to a seventh node;

a fourth inverter transistor including a control electrode connected to the sixth node, a first electrode connected to the seventh node and a second electrode which receives the low voltage;

a fifth inverter transistor including a control electrode connected to the seventh node, a first electrode which receives the high voltage and a second electrode connected to the output node; and a sixth inverter transistor including a control electrode connected to the seventh node, a first electrode connected to the output node and a second electrode which receives the low voltage.

17. An electronic device comprising:

a display panel including a pixel circuit;

a data driver which applies a data voltage to the display panel;

a gate driver which outputs a gate signal to the display panel;

a sweep voltage generator which applies a sweep voltage to the display panel;

an emission driver which applies an emission signal to the display panel;

a driving controller which controls the data driver, the gate driver, the sweep voltage generator and the emission driver based on an input control signal; and a processor which outputs the input control signal, wherein the pixel circuit includes:

a voltage applier which generates an alternating control voltage based on the data voltage and the sweep voltage;

an alternating signal generator which outputs an alternating signal based on the alternating control voltage;

an emission controller which applies a driving current to a light emitting element in response to the emission signal and the alternating signal; and the light emitting element connected to the emission controller, and wherein the alternating signal generator includes:

a first alternating signal control transistor which applies a voltage of an output node of a ring oscillator to an input node of the ring oscillator in response to the alternating control voltage;

the ring oscillator which outputs the alternating signal; and a second alternating signal control transistor which applies a low voltage to the ring oscillator in response to the alternating control voltage.

* * * * *